(12) United States Patent
Dandurand

(10) Patent No.: US 7,347,512 B2
(45) Date of Patent: Mar. 25, 2008

(54) POWDER SNOW TRACK FOR SNOWMOBILE

(75) Inventor: Jules Dandurand, Sherbrooke (CA)

(73) Assignee: Camoplast Inc., Sherbrooke, Quebec (CA)

( * ) Notice: Subject to any disclaimer, the term of this patent is extended or adjusted under 35 U.S.C. 154(b) by 205 days.

(21) Appl. No.: 11/211,833

(22) Filed: Aug. 25, 2005

(65) Prior Publication Data

US 2006/0006737 A1    Jan. 12, 2006

(30) Foreign Application Priority Data

Sep. 7, 2004    (CA) .................................... 2480779

(51) Int. Cl.
   *B62D 55/26*    (2006.01)
(52) U.S. Cl. ...................... 305/178; 305/165
(58) Field of Classification Search ................ 305/160, 305/165, 178, 179, 181, 180, 46, 51
   See application file for complete search history.

(56) References Cited

U.S. PATENT DOCUMENTS

| 4,095,849 | A | * | 6/1978 | Husted | 305/165 |
|---|---|---|---|---|---|
| 4,938,546 | A | * | 7/1990 | Simmons | 305/180 |
| 5,713,645 | A | * | 2/1998 | Thompson et al. | 305/168 |
| 5,730,510 | A | * | 3/1998 | Courtemanche | 305/168 |
| D393,607 | S | * | 4/1998 | Dandurand | D12/7 |
| 6,109,705 | A | * | 8/2000 | Courtemanche | 305/178 |
| 6,203,125 | B1 | * | 3/2001 | Arakawa et al. | 305/166 |
| 6,505,896 | B1 | * | 1/2003 | Boivin et al. | 305/178 |
| 6,540,310 | B1 | * | 4/2003 | Cartwright | 305/180 |
| 6,609,771 | B2 | * | 8/2003 | Morin et al. | 305/178 |
| 7,018,005 | B2 | * | 3/2006 | Lemieux | 305/178 |
| 2002/0033643 | A1 | * | 3/2002 | Soucy et al. | 305/178 |

\* cited by examiner

*Primary Examiner*—Russell D. Stormer
(74) *Attorney, Agent, or Firm*—Fulbright & Jaworski LLP

(57) ABSTRACT

The present invention provides an endless track belt allowing an enhanced traction of a tracked vehicle over a range of surface conditions, by providing tread on the ground-engaging surface having a top part and a bottom part, the top part being flexible, whereas the bottom part is rigid. On a loose underground such as powder snow, the flexible top part of the tread bends to apply a compacting action on the underground, while, on a packed underground, the rigid bottom part of the tread has a grabbing action on the underground.

11 Claims, 3 Drawing Sheets

POWDER SNOW TRACK FOR SNOWMOBILE

CROSS REFERENCE TO RELATED APPLICATIONS

This application claims priority on Canadian application no 2,480,779 filed on Sep. 7, 2004. All documents above are herein incorporated by reference.

FIELD OF THE INVENTION

The present invention pertains to an endless track. More specifically, the present invention is concerned with a track having an enhanced traction performance over a range of surfaces.

BACKGROUND OF THE INVENTION

A propulsion system generally found on tracked vehicles such as snowmobiles consists of a pair of longitudinally spaced apart wheel structures arranged on opposite sides of the vehicle chassis, which is driven by a pair of endless, substantially inextensible belts, each having an inner surface and a ground-engaging surface.

The inner surface is provided with a series of longitudinally spaced members, which guide the track relative to driving and tracking wheels forming part of the wheel structures. The ground-engaging surface of the belt is formed of a plurality of longitudinally spaced tread members that provide traction to the vehicle when traveling on various ground conditions. The ground-engaging surface of the track may comprise a series of integral profiles having various configurations to provide traction to the snowmobile.

Therefore, a track is usually formed of a body of elastomeric material, the ground-engaging surface thereof displaying a series of transverse profiles that provide traction for the snowmobile as it travels over a surface, while the inner surface of the track displays a series of integral lugs, which are contacted by sprocket wheels that drive the snowmobile track in rotation.

In spite of a number of developments in the field of tracks, there is still a need in the art for a track allowing efficient traction of a tracked vehicle over a range of surface conditions.

SUMMARY OF THE INVENTION

There is provided a track comprising an endless drive belt with a ground-engaging surface bearing a series of transversally extending treads, wherein each tread has a straight profile from a top part thereof to a bottom part thereof, an outer edge of the top part being generally flat and flexible, and a section of the top part being smaller than a section of the bottom part.

There is further provided an endless belt for a snowmobile track, having a ground engaging surface bearing treads, each treads having a top part of a section smaller than a bottom part thereof, the top part being flexible, the top part compacting a powder snow and the bottom part having a grabbing action on packed snow.

Other objects, advantages and features of the present invention will become more apparent upon reading of the following non-restrictive description of specific embodiments thereof, given by way of example only with reference to the accompanying drawings.

DESCRIPTION OF SPECIFIC EMBODIMENTS

Generally stated, the present invention provides a track that allows an improved performance over a range of surfaces, including snow in a variety of states, from powder snow to hard snow, or sand from wet to hardened sand for example.

Figure 1:
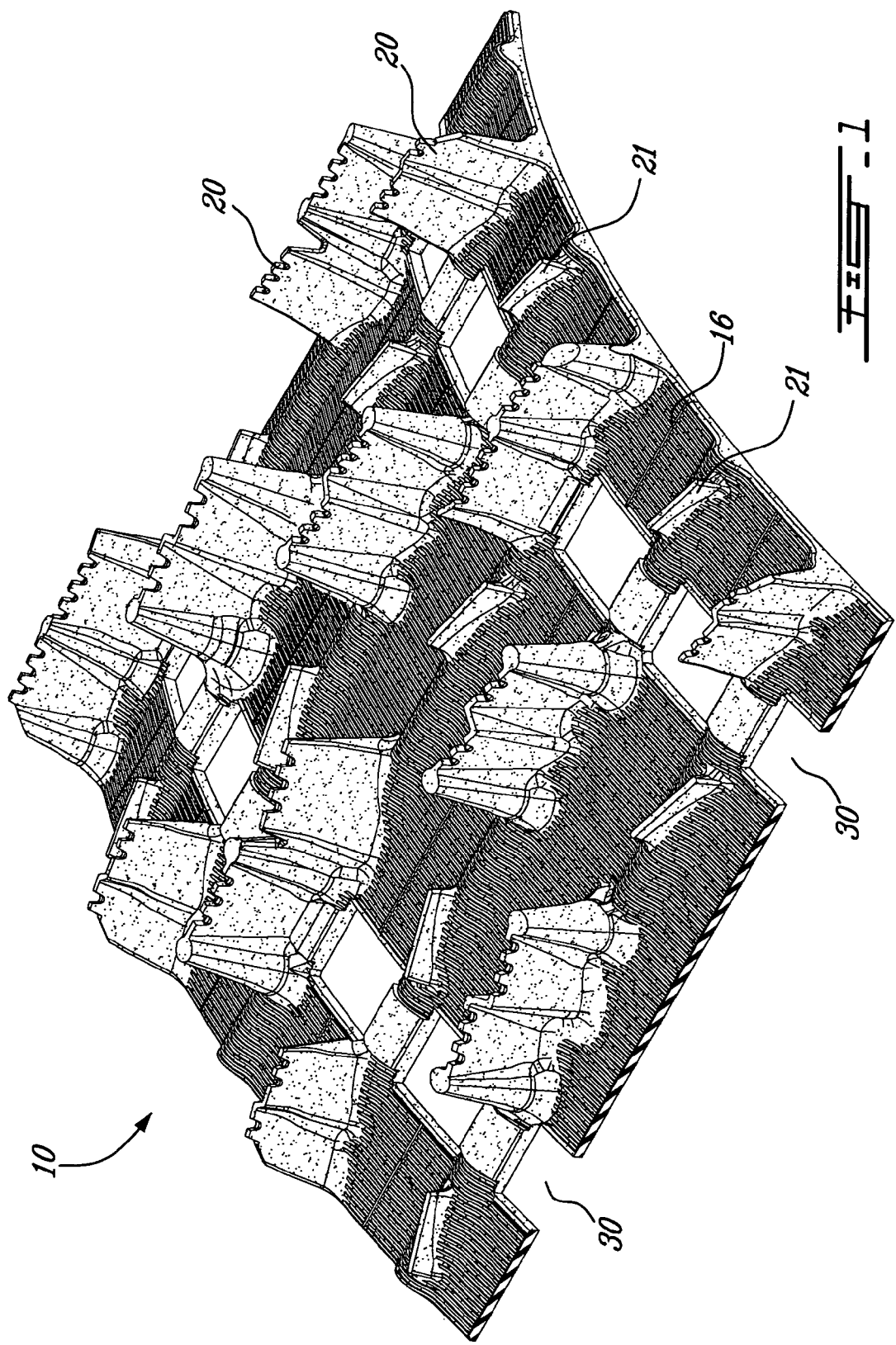
FIG. 1 is a top partial perspective view of a track according to an embodiment of the present invention.
Figure 2:
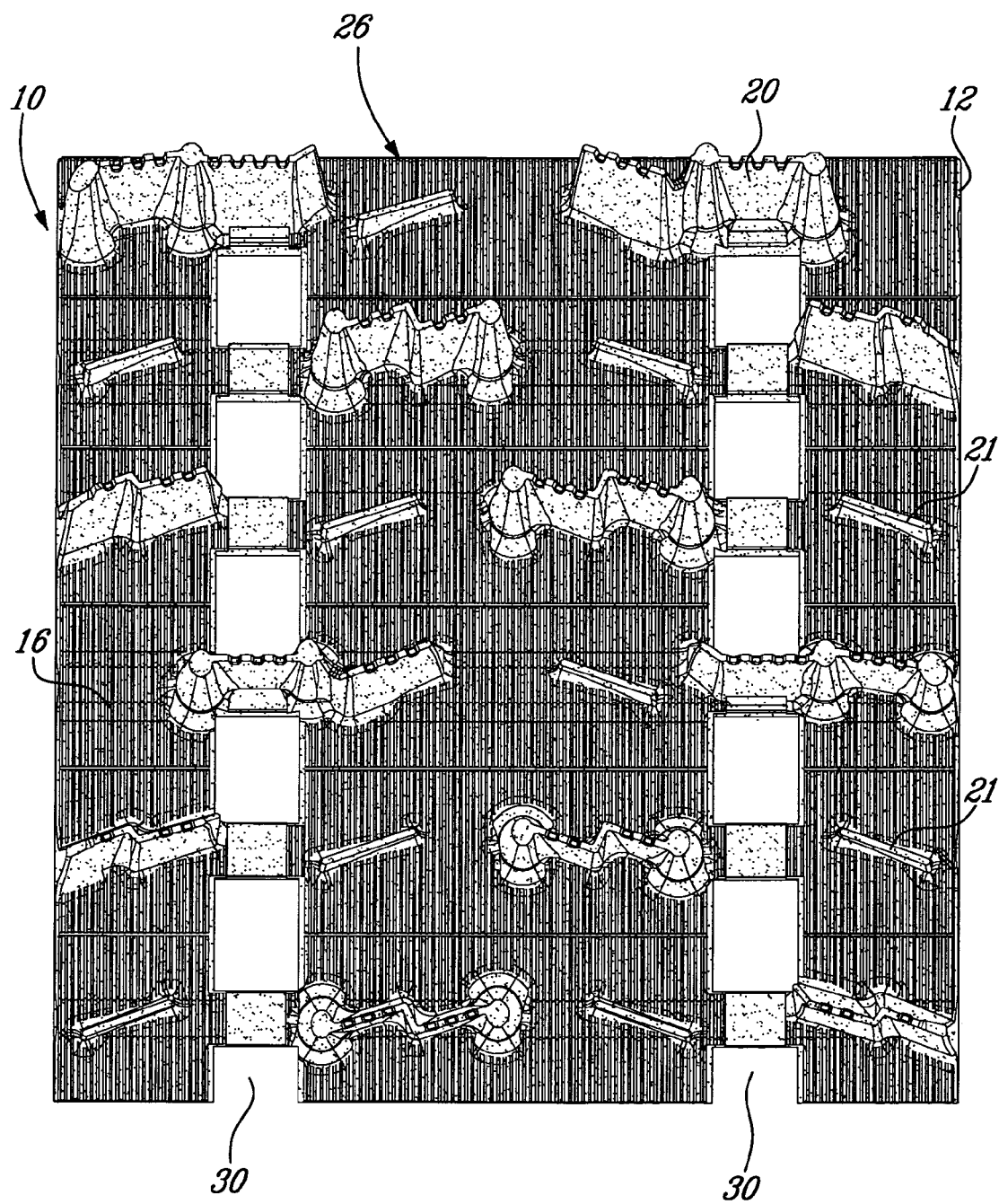
FIG. 2 is a top partial view of the track of FIG. 1.

Turning to FIGS. 1 and 2 of the appended drawings, a track according to an embodiment of the present invention will now be described.

A track 10 typically comprises an endless drive belt 12 trained around drive sprockets or wheels (not shown) for driving the belt 12 in an endless path.

The belt 12 has an inner surface face (not seen) and a ground-engaging surface 16, which, as it passes along a lower run of the belt 12, engages a surface (not shown) to be traversed. The inner track surface is typically provided with spaced drive lugs, which are spaced along the length of the inside of the belt 12 for engaging the drive wheels (not shown) as is well known in the art.

The ground-engaging surface 16 comprises a series of transversally extending treads 20 and 21 extending generally from a center of the ground-engaging surface 16 to lateral edges thereof. The treads 20, 21 may be made of a rubber material.

The endless belt 12 may be made of flexible rubber or flexible rubber reinforced by rods to strengthen the track, as is well known in the art. Typically, conventional tracks include, embedded in the rubber material of the body of the belt 12 and in the region the treads 20, 21, such reinforcing rods, either metallic or plastic, to provide transverse rigidity to the track 10. Moreover, the track 12 may comprise longitudinal perforated bands 30 supporting steel fasteners, as known in the art.

Figure 3:
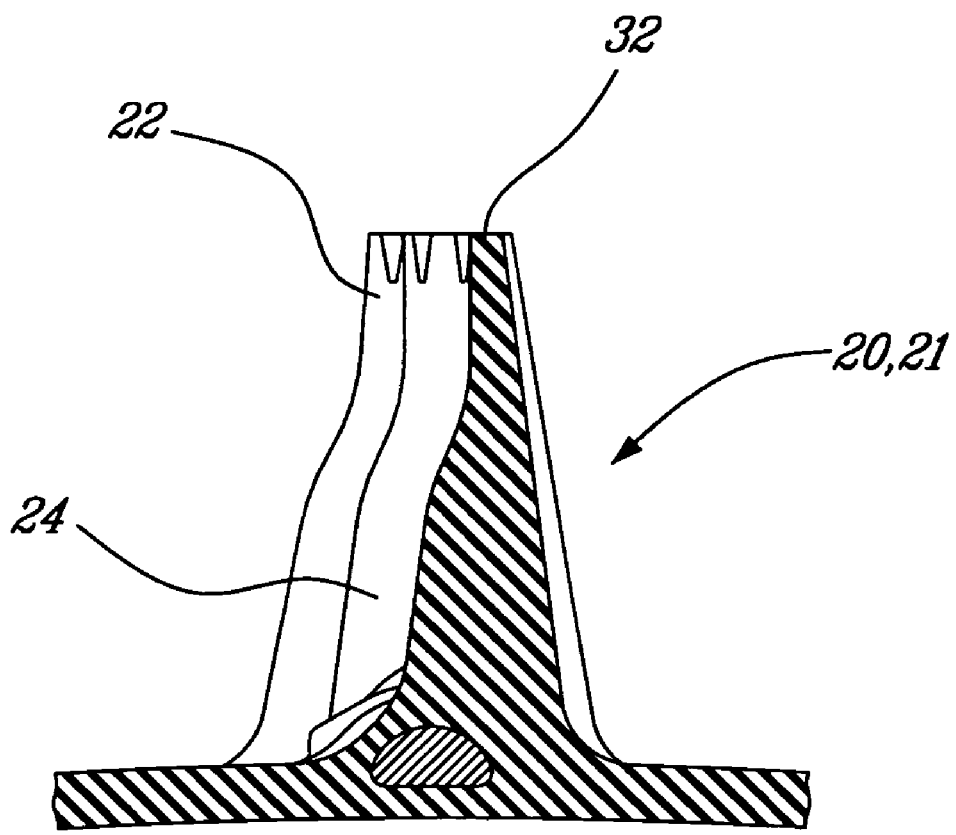
FIG. 3 is a cross section of a tread extending from a ground-engaging surface of the track of FIGS. 1 and 2.

As illustrated in FIG. 3, each tread 20, 21 has a straight profile, devoid of lateral curvature, from a top part 22 thereof to a bottom part 24 thereof, and an outer edge 32 of the top part 22 is generally flat. Moreover, the top part 22 has a section smaller than the bottom part thereof 24, the bottom part 24 thus being more massive and rigid. The reduced section of the top part 22 provided increased flexibility of this part of the tread 20, 21.

It is found that on powder snow for example, the top parts 22 are allowed to bend, thereby compacting the snow instead of cutting therethrough, which results in an enhanced traction of the tracked vehicle over the powder snow. Indeed such a compacting effect assists the vehicle into uplifting and extracting itself from heavy snow, instead of digging itself deeper therein. On packed snow, enhanced traction is also achieved through a grabbing action of the bottom parts 24.

Such a non-uniformity between the top and bottom parts of the treads therefore allows an enhanced traction over a range of snow conditions. Moreover, it is found that it contributes to extending the service life of the track.

It is further found that treads 21 located at the position of the reinforcing rods of the track during the molding stage of the track are efficient in allowing an easier fabrication process. In order not to increase the weight of the track, these treads 21 may be provided with a reduced height compared to treads 20.

The ground-engaging surface 16 may further comprise a longitudinal texture 26 made of adjacent longitudinal ribs. For example, there may between about 10 and 300 ribs of a height between about 10 and 250 milli-inches, over a width of the track of 15 inches. Such longitudinal texture is found to increase rigidity in flexion of the track 10.

Obviously, such a track may be used for recreational vehicles, snowmobiles or ATV for example.

Although the present invention has been described hereinabove by way of specific embodiments thereof, it can be modified, without departing from the spirit and nature of the subject invention as described herein.

The invention claimed is:

1. A track comprising an endless drive belt with a ground-engaging surface bearing a series of transversally extending treads, wherein each tread comprises a flexible top part operable to bend and thereby cause a compacting action that compacts powder snow into packed snow, and a rigid bottom part operable to cause grabbing action that provides traction on the packed snow.

2. The track of claim 1, wherein the endless belt is made of one of a flexible rubber and a flexible rubber reinforced by rods, and the treads are made of a rubber material.

3. The track of claim 2, wherein said rods are embedded in a material of the belt in a region of the treads.

4. The track of claim 2, wherein said rods are one of metallic and plastic.

5. The track of claim 2, wherein some of the treads are located at a position of the rods.

6. The track of claim 2, further comprising longitudinal perforated bands supporting steal fasteners.

7. The track of claim 1, said ground-engaging surface further comprising a longitudinal texture made of adjacent longitudinal ribs.

8. The track of claim 7, the track having a width of 15 inches, said a longitudinal texture comprising between 10 and 300 ribs of a height between about 10 and 250 milli-inches, over the width of the track.

9. The track of claim 1, for one of a recreational vehicle, a snowmobile and an ATV.

10. An endless belt for a snowmobile track having a ground engaging surface bearing treads, each tread having a top part and a bottom part, said top part being flexible and operable to bend and cause a compacting action on the powder snow and transform it into packed snow, and said bottom part being rigid and operable to create a grabbing action on the packed snow.

11. The endless belt of claim 10, said ground-engaging surface further comprising a longitudinal texture made of adjacent longitudinal ribs.

* * * * *

UNITED STATES PATENT AND TRADEMARK OFFICE
CERTIFICATE OF CORRECTION

| | | |
|---|---|---|
| PATENT NO. | : 7,347,512 B2 | Page 1 of 1 |
| APPLICATION NO. | : 11/211833 | |
| DATED | : March 25, 2008 | |
| INVENTOR(S) | : Jules Dandurand | |

It is certified that error appears in the above-identified patent and that said Letters Patent is hereby corrected as shown below:

In claim 1, column 3, line 22, please insert --a-- between "cause" and "grabbing".

Signed and Sealed this

First Day of July, 2008

JON W. DUDAS
*Director of the United States Patent and Trademark Office*